United States Patent [19]

Cutler et al.

[11] 3,834,156

[45] Sept. 10, 1974

[54] ENGINE TURBOCHARGING SYSTEM WITH VENTED COMPRESSOR BEARING

[75] Inventors: John Frederick Cutler; Robert Andrew Edwards, both of Indianapolis; Charles Richard Sarle, Noblesville, all of Ind.

[73] Assignee: Wallace-Murray Corporation, New York, N.Y.

[22] Filed: Jan. 10, 1973

[21] Appl. No.: 322,375

[52] U.S. Cl...... 60/597, 417/406, 123/119 B, 60/614
[51] Int. Cl............................................ F02b 37/04
[58] Field of Search............. 60/13; 123/119 B, 136

[56] References Cited
UNITED STATES PATENTS

| | | | |
|---|---|---|---|
| 3,077,296 | 2/1963 | Ping | 415/180 |
| 3,260,130 | 7/1966 | Pitts | 123/119 B |
| 3,363,613 | 1/1968 | Price | 123/119 B |
| 3,380,245 | 4/1968 | Mick | 60/13 |

Primary Examiner—Carlton R. Croyle
Assistant Examiner—O. T. Sessions
Attorney, Agent, or Firm—Cameron, Kerkam, Sutton, Stowell & Stowell

[57] ABSTRACT

Disclosed is a combination of a spark ignition internal combustion engine and an exhaust gas driven turbocharger whose compressor component delivers charge air to the air induction system of the engine downstream of the engine carburetor and air cleaner. A tube provides communication between the crankcase of the engine and the impeller shaft bearing housing of the turbocharger compressor component to thereby permit entry of crankcase gases into the bearing housing thereby eliminating the ingestion of bearing lubricating oil along the impeller shaft and through the impeller shaft bearing into the compressor discharge passage when a vacuum condition exits in the compressor component as for example under engine idle condition.

6 Claims, 2 Drawing Figures

PATENTED SEP 10 1974  3,834,156

ENGINE TURBOCHARGING SYSTEM WITH VENTED COMPRESSOR BEARING

BACKGROUND OF THE INVENTION

In conventional rotating machinery such as gas turbine driven superchargers, it is customary to provide sleeve or ball bearings lubricated by oil under pressure as a means of sustaining rotation of the main shaft. This lubricating oil must be confined within the bearing area and then carried away to an oil sump. In the case of turbochargers, since entry of lubricating oil into the engine cylinders is highly undesirable, the lubricating oil must be prevented from entering the compressor housing. In low speed rotating machinery positive contact type oil seals are in general use. However, in high speed applications, as in the case of a turbocharger, the positive contact seals are unsatisfactory because of high friction losses and rapid wear of the contact surfaces.

In diesel engines supercharged by a turbocharger, under certain operating conditions, the engine aspirates more air flow than can be supplied by the turbocharger compressor. A vacuum condition may at times exist in the compressor which can reach magnitudes of the order of 3 to 5 inches of mercury. Since pressure existing in the oil drain area or bearing housing is normally atmospheric or slightly positive, the presence of a sub-atmospheric pressure in the compressor housing induces, or causes ingestion of, oil droplets from the bearing housing, through the bearing itself, and into the compressor housing. For diesel, or compression ignition engines, one solution to this problem has involved venting the bearing housing to atmosphere so that, when vacuum conditions exist in the compressor housing, air from the vented bearing housing will be drawn through the bearing assembly rather than bearing lubricating oil. This arrangement is disclosed in U.S. Pat. No. 3,077,296, assigned to the assignee of the present invention.

In recent attempts to modify the performance of spark ignition engines, in automobiles for example, the turbocharger is connected to the engine so that the air charge delivered by its compressor component is introduced into the engine air induction system downstream of the carburetor and its associated air cleaner. Under engine idling condition, with this arrangement, a vacuum of the order of 18 to 20 inches of mercury may exist in the turbocharger compressor housing with the engine at idle and, with the engine overrunning during deceleration, a vacuum of 24 to 26 inches may exist, a condition more severe than the similar condition for diesel engines, referred to above, by a factor of at least 6 to 1. Elimination or minimization of oil leakage under these conditions is a difficult problem. Venting the bearing housing to atmosphere as a solution is unsuitable because automobile pollution control standards, existing and prospective, make it undesireable to permit reverse flow through the vent to atmosphere as occurs whenever the bearing housing is at a slight positive pressure, its normal condition.

The combination of the present invention minimizes oil leakage through the compressor impeller shaft bearing into the compressor discharge of a turbocharger by connecting the bearing housing, not directly to atmosphere, but to an engine fluid collection point of the spark ignition engine served by the turbocharger. The engine fluid collection point with which the bearing housing is placed in communication may be the engine crankcase, an oil sump, the air cleaner area upstream of the engine carburetor, etc. Where the fluid collection point is the engine crankcase, the crankcase fumes and blow-by gases are returned, by a "closed" system, to the engine air induction conduit and these gases serve to be drawn through the compressor bearing when, under engine overrun or idle condition, a vacuum exists in the compressor housing. Since these gases are available to satisfy the vacuum existing in the compressor housing, the tnedency to draw bearing lubricating oil into the compressor discharge is minimized.

DESCRIPTION OF THE PREFERRED EMBODIMENT

Figure 1:
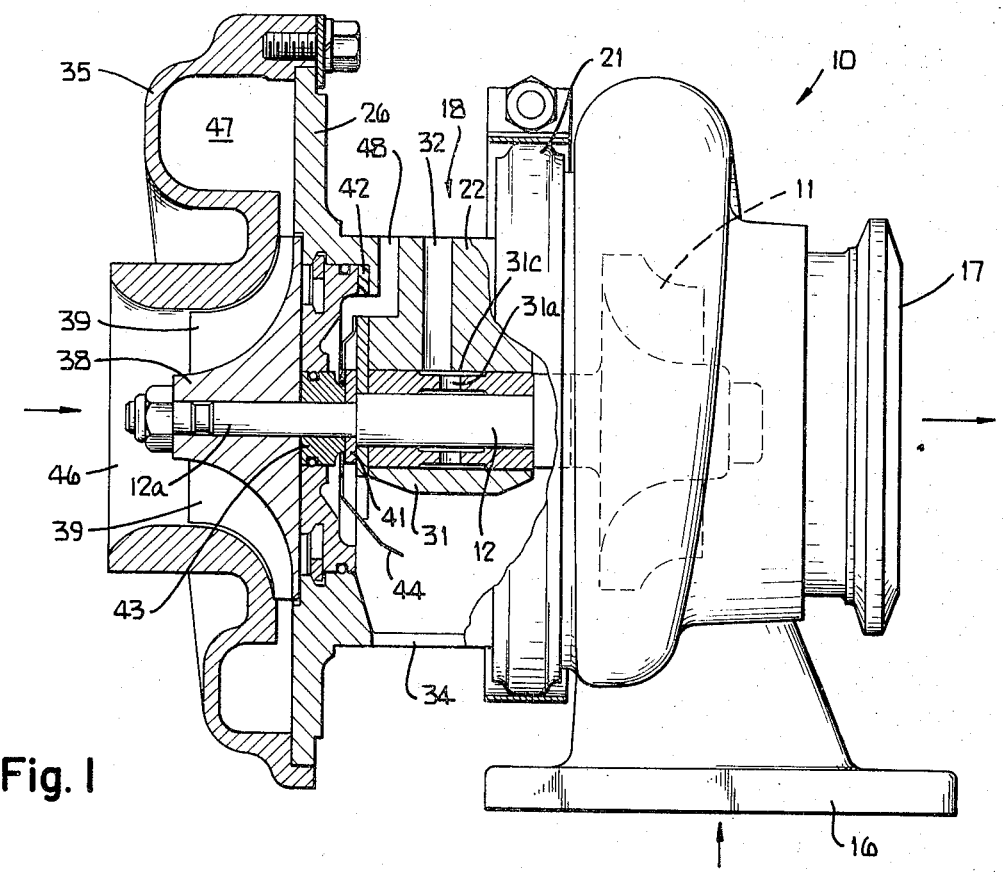
FIG. 1 is side view of a turbocharger with a part of the compressor housing broken away, showing the bearing vent system of the present invention.

Referring to the drawings there is illustrated a gas turbine driven supercharger which includes a turbine housing 10 enclosing a conventional bladed turbine wheel 11 adapted to drive the shaft 12. The turbine housing is provided with a flanged inlet passage 16 which transmits engine exhaust gases to the turbine wheel. The turbine, itself, is of conventional construction and operates in conventional manner, that is, high pressure gases entering the turbine are expanded through the turbine wheel causing rotation of the shaft 12, the spent gases being discharged through the turbine outlet 17. Attached to the turbine housing 10 is a bearing housing casting 18, the two castings being retained together in sealed relation by means of the clamp ring 21. The casting 18 is asymmetrical in configuration and includes a central portion 22 and an outwardly flanged portion 26. The central portion 22 is provided with an aperture accommodating the shaft 12, the shaft extending through a sleeve-type bearing 31. The bearing has a series of apertures 31a which provide for lubricating oil circulation around the bearing. The lower portion of the bearing housing casting is provided with an oil drain opening 34, the drain opening having attached to it a suitable conduit for returning the lubricating oil to the engine lubricating system. Bolted to the flange portion 26 of the casting 22 is a compressor cover casting 35. The shaft 12 has an extended portion 12a, of reduced diameter, which has mounted on it a centrifugal type compressor wheel 38 carrying a plurality of blades 39. The reduced portion 12a of the shaft carries a thrust ring 41 which cooperates with a stationary thrust bearing member 42. The shaft portion 12a also carries a flinger sleeve 43 and an oil deflector 44 serves to direct into the drain opening area 34 any oil droplets thrown outwardly by the bearing assembly. The compressor cover casting 35 is flanged to provide an inlet passage 46 which is adapted to communicate with the air induction system of the engine served by the turbocharger. Rotation of the compressor wheel 38 functions to draw air through the inlet passage 46 and delivers the air, at elevated pressure, to the collector area 47.

The bearing housing casting 22 and the stationary thrust bearing member are provided with a vent passage 48 which communicates with the upper portion of the cavity surrounding the compressor bearing area. As may be seen in FIG. 2, the turbine intake passage 16 is, in operation, connected to the exhaust manifold 51 of a spark engine indicated schematically at 52. The compressor component of the turbocharger has its discharge passage 53 (which communicates with the compressor collector chamber 47) connected to the air inlet manifold 54 of the engine. The intake of the compressor component is connected to the engine air-fuel vaporizing means in the form of the carburetor, indicated schematically at 56, which receives the air flow induced through the air cleaner 57. It will be understood that the vaporizing means might take the form of fuel injection means rather than a carburetor. As shown in the drawings, a tube 58 provides communication between the vent passage 48 (FIG. 1) in the bearing housing casting 22 and the crankcase chamber, indicated schematically at 59, of the engine 52. The words "crankcase chamber" are herein used in a generic sense and are intended to include any oil collecting sump or the like utilized with the engine. As previously mentioned, the crankcase chamber is only one possible connection for the tube 58, any other engine fluid collection point will also fulfill the required function.

Figure 2:
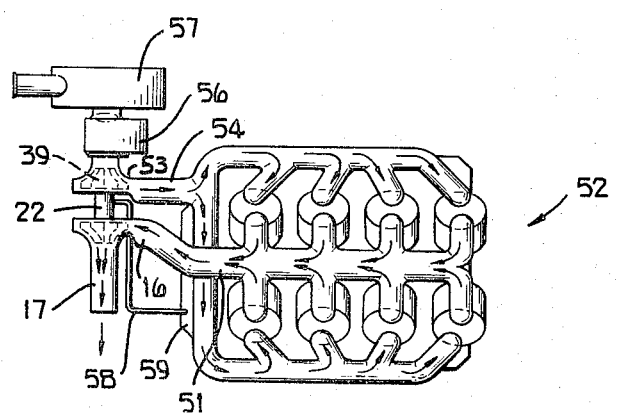
FIG. 2 is a schematic view of the bearing to crankcase venting system incorporated into a turbocharged spark-ignition engine.

When the engine is in operation, the relatively high vacuum, which can appear in the turbocharger compressor housing at throttle back-off and at engine-idle conditions, is satisfied by gases or vapors moving from the engine fluid collection point, through tube 58, and into the compressor bearing area. These gases, in place of lubricating oil, are thus drawn through the compressor bearing under high vacuum conditions into the compressor housing and returned to the engine air induction system. When the engine fluid collection point to which tube 58 is connected is the engine crankcase, as shown in FIG. 2, crankcase vapors move into the compressor housing. The blow-by gases, with this arrangement, have a reduced tendency to enter the lubricating oil lines and hamper oil flow. The passage 32 terminates, within the interior of the bearing housing at a location well above the lubricating oil drain opening 34, an area relatively free of oil particles, so that the entering crankcase gases do not entrain oil droplets.

We claim:

1. In combination, an internal combustion engine of the spark ignition type having an engine fluid collection point and an air-fuel vaporizing means under the control of a throttle valve for providing an air-fuel mixture to the air induction conduit for the engine, an air charging means for providing additional air to the engine and including a compressor having its discharge passage communicating with the air induction conduit of the engine and having its intake passage coupled to said air fuel vaporizing means, said compressor having an impeller disposed adjacent a collector area and having an impeller shaft which is supported on a bearing assembly within a bearing housing through which lubricating oil is circulated and a conduit connecting the engine fluid collection point with the interior of said bearing housing to permit entry of gases from said fluid collection point into said bearing housing thereby eliminating the ingestion of lubricating oil through said impeller shaft bearing assembly and into the compressor discharge passage when pressure in said air induction conduit decreases as said throttle valve is closed.

2. A combination as claimed in claim 1 in which said air charging means takes the form of an exhaust gas driven turbocharger with said compressor impeller shaft being driven by a turbine through which exhaust gases from said engine are expanded.

3. A combination as claimed in claim 2 in which said air-fuel vaporizing means takes the form of a carburetor.

4. A combination as claimed in claim 1 in which said bearing housing is provided with a gravity oil drain opening in its lower wall and the junction of said conduit with the interior of the bearing housing is a substantial distance above said oil drain opening.

5. A combination as claimed in claim 1 in which said engine fluid collection point is the engine crankcase chamber.

6. A combination as claimed in claim 1 in which said engine fluid collection point is upstream of the air-fuel vaporizing means.

* * * * *